(12) United States Patent
Yamazaki et al.

(10) Patent No.: US 6,493,775 B2
(45) Date of Patent: *Dec. 10, 2002

(54) CONTROL FOR TIMED ACCESS OF DEVICES TO A SYSTEM BUS

(75) Inventors: Naomi Yamazaki; Ryoetsu Nakajima; Masumi Fujino, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,604

(22) Filed: Jan. 19, 1999

(65) Prior Publication Data

US 2002/0069311 A1 Jun. 6, 2002

(30) Foreign Application Priority Data

Mar. 19, 1998 (JP) ............................. 10-070544

(51) Int. Cl.[7] ............................................. G06F 13/42
(52) U.S. Cl. ......................... 710/107; 710/25; 710/28; 713/400
(58) Field of Search ..................... 710/22–28, 107–125, 710/126–130; 711/167–169; 713/400–601

(56) References Cited

U.S. PATENT DOCUMENTS

| 4,095,265 | A | * | 6/1978 | Vrba | ........................ 711/169 |
| 4,410,943 | A | * | 10/1983 | Barlow | ........................ 711/151 |
| 5,034,917 | A | * | 7/1991 | Bland et al. | ................. 711/167 |
| 5,182,800 | A | * | 1/1993 | Farrell et al. | ................. 710/24 |
| 5,613,162 | A | * | 3/1997 | Kabenjian | .................... 710/22 |
| 5,615,382 | A | * | 3/1997 | Gavin et al. | ................... 710/53 |
| 5,768,560 | A | * | 6/1998 | Lieberman et al. | ......... 711/167 |
| 5,826,045 | A | * | 10/1998 | Reams | ........................ 710/107 |

FOREIGN PATENT DOCUMENTS

| JP | 60-147866 | 8/1985 |
| JP | 5-265932 | 10/1993 |

* cited by examiner

Primary Examiner—Sumati Lefkowitz
(74) Attorney, Agent, or Firm—Katten Muchin Zavis Rosenman

(57) ABSTRACT

A bus control device having a plurality of devices such as a processor or a DMAC which can be a bus master accessing a system bus. When the processor transfers data to a memory or a processing circuit, a system bus controller for the processor and a system bus controller for the memory or a system bus controller for the processing circuit access the system bus within an accessible minimum time with each of input/output signals. When the DMAC transfers data to the memory or the processing circuit, a system bus controller for the DMAC and the system bus controller for the memory or the system bus controller for the processing circuit access the system bus within the accessible minimum time with each of the input/output signals.

19 Claims, 13 Drawing Sheets

CONTROL FOR TIMED ACCESS OF DEVICES TO A SYSTEM BUS

BACKGROUND OF THE INVENTION

1. Field of the Invention

The present invention relates to a bus control device, and in particular to a bus control device which enables a plurality of devices such as processors and DMAC's (Direct Memory Access Controllers) which can be a bus master to access a system bus.

In recent years, the performance of a serial processing computer is going to approach the physical limits. As one solution for further improving the performance of a computer, a multi-processor system has been proposed. In this system, how effectively the bus control device utilizes the system bus is important.

2. Description of the Related Art

FIG. 11 illustrates an arrangement of a general bus control device, in which to an address bus 21, a data bus 22, and a control bus 23 forming a system bus 20, are connected processors (hereinafter occasionally referred to as MPU's) 10a and 10b, a DMAC 11, a memory 12, and processing circuits (hereinafter occasionally referred to as I/O's (Input/Output circuits)) 13a and 13b.

It is to be noted that FIG. 11 does not show a usual system bus controller for the MPU 10a, the MPU 10b, the DMAC 11, the memory 12, the I/O 13a, and the I/O 13b.

FIG. 12 illustrates a timing sequence of the MPU 10a accessing the system bus 20, namely, a read cycle of the MPU 10a in which the MPU 10a reads data from the memory 12 and a write cycle in which the-MPU 10a writes data in the memory 12.

The bus control device in its entirety synchronizes with a bus clock 101, while the MPU 10a synchronizes with a clock 201 which is made by dividing the frequency of the bus clock 101 into the half.

In the read cycle, the MPU 10a outputs an address signal 202 at the fall of the clock 201 (at timing t41) and activates a memory read signal 203 (negative-true logic) at the subsequent rise of the clock 201 (at timing t42). A system bus controller of the MPU 10a, having received the address signal 202 and the memory read signal 203, activates an MPU 10a-bus request signal 102 (negative-true logic) at the subsequent rise of the bus clock 101 (at timing t43).

Upon receiving this request signal 102, the system bus first confirms that the address bus 21 and the data bus 22 are accessible, and then activates an MPU 10a-bus acknowledge signal 103 (negative-true logic) at the subsequent fall of the clock 101 (at timing t44). Having received this bus acknowledge signal 103, the system bus controller of the MPU 10a outputs the address signal 202 and the memory read signal 203 to the address bus 21 and the control bus 23 respectively.

Receiving the address signal 202 and the memory read signal 203 from the address bus 21 and the control bus 23 respectively, the memory 12 outputs a data signal 208 designated by the address signal 202 to the data bus 22. When the data signal 208 become effective on the data bus 22 (at timing t45), the system bus controller of the MPU 10a outputs a ready signal 207 notified by the memory 12 to the MPU 10a. The MPU 10a reads the data, completes the read cycle, and then releases the system bus (at timing t46).

In the write cycle, the MPU 10a outputs the address signal 202 at the fall of the clock 201 (at timing t51), and without activating the memory read signal 203, outputs a data signal (not shown in FIG. 12) at the subsequent rise of the clock 201 (at timing t52). As in the read cycle, the system bus controller of the MPU 10a, after having made a bus request with the bus request signal 102 (at timing t53), receives the bus acknowledge signal 103. Having received this bus acknowledge signal 103, the system bus controller outputs the address signal 202 to the address bus 21 and outputs the said data to the data bus 22 as the data bus signal 208.

The system bus controller of the MPU 10a outputs a memory write signal 204 to the control bus 23 (at timing t55). Having received this memory write signal 204, the memory 12 has the data signal 208 designated by the data bus 22 written in the address designated by the address signal 202 on the address bus 21. The system bus controller, after having completed writing data to the memory 12, outputs the ready signal 207 notified by the memory 12 to the MPU 10a (at timing t56). The MPU 10a completes the write cycle and releases the system bus (at timing t57).

FIG. 13 illustrates a timing sequence for the DMAC 11 to access the system bus 20, namely, a read and a write cycle for the DMAC 11 to read data from the memory 12 to write the data in the I/O 13a and to write the data read from the I/O 13a in the memory 12, respectively.

As in FIG. 12, the bus control device in its entirety synchronizes with the bus clock 101, while the DMAC 11 synchronizes with the clock 201 which is made by dividing the frequency of the bus clock 101 into the half.

In the read cycle, the DMAC 11 outputs the address signal 202 at the fall of the clock 201 (at timing t61) and activates-the memory read signal 203 (negative-true logic) at the ;subsequent rise of the clock 201 (at timing t62). A system bus controller of the DMAC 11 transmits/receives a DMAC-bus request signal 102 (hereinafter a hyphen "-" indicates that the latter is used for the former) and a DMAC-bus acknowledge signal 103 to/from the system bus, and acquires a use (right for use) of the system bus (at timings t63, t64). Then the system bus controller of the DMAC 11 outputs the address signal 202 and the memory read signal 203 to the address bus 21 and the control bus 23 respectively.

Receiving the address signal 202 and the memory read signal 203 from the address bus 21 and the control bus 23 respectively, the memory 12 outputs the data signal 208 designated by the address signal 202 to he data bus 22. At the subsequent rise of the clock 201 (at timing t65), he DMAC 11 outputs an I/O write signal 206.

When the data signal 208 become effective on the data bus 22, the I/O 13a, having received the I/O write signal 206, reads the data signal 202 on the data bus 22. The system bus controller of the DMAC 11 outputs the ready signal 207 notified by the memory 12 (at timing t66). The DMAC 11 completes the read cycle and releases the system bus (at timing t67).

In the write cycle, the operations at the timings t71~t74 are the same as the read cycle except that at at timing t72, the DMAC 11 activates an I/O read signal 205 instead of activating the memory read signal 203. At timing t74, having acquired a use of the system bus, the system bus controller of the DMAC 11 outputs the address signal 202 and the I/O read signal 205 to the address bus 21 and the data bus 23, respectively.

Upon receiving the I/O read signal 205, the I/O 13a outputs the data signal 208 to the data bus 22. At the subsequent rise of the clock 201 (at timing t75), the DMAC 11 outputs a memory write signal 204. In response to this signal, the memory 12 has the address signal 202 on the address bus 21 to read in the data signal 208 on the data bus 23.

At the end of the reading operation in view of the memory access time (at timing t76), the system bus controller of the DMAC 11 outputs the ready signal 207 notified by the memory 12 to the DMAC 11. Then the DMAC 11 completes the write cycle and releases the system bus (at timing t77).

In such a prior art bus control device, any one of the MPU 10a, the MPU 10b and the DMAC 11 executes the process as a bus master. This bus master occupies the system bus 20 from the beginning to the end of the cycle time for accessing the memory 12 or the I/O's 13a, 13b.

Therefore, the MPU or the DMAC other than the bus master has to wait until the bus master completes the cycle time and releases the system bus 20 because no acknowledge signal is returned for the bus request signal.

As a result, even if a plurality of MPU's or DMAC's are mounted in order to improve the performance of a system, due to a bottleneck caused by the system bus 20, the performance of the entire system is restricted to the extent of 50 to 60% at most by the multiple of the increased number of devices such as MPU's. Moreover, if the access time of the memory 12, the I/O 13a, or the I/O 13b is short, the system bus 20 is occupied by the memory 12, the I/O 13a, or the I/O 13b, resulting in a decline of the entire system performance.

For the solution, there is a method in which priorities are assigned to the bus accesses by a plurality of MPU's and DMAC's, accepting the bus request from an MPU or a DMAC in the order of the priority to shorten the waiting time. Usually, the priority for the bus access is assigned higher for the DMAC than the MPU. In this case, when the DMAC begins the data transfer, the MPU has to wait until all the data transfer by the DMAC is finished. Therefore, the MPU of the bus control device including the DMAC is not applicable to a system requiring a real time processing. For the measures, the MPU's and the DMAC's may use different buses. However, this requires a large-scaled system and a high cost.

In addition, if the MPU 10a hangs up while occupying the system bus 20, the other MPU 10b and the DMAC11 cannot access the system bus 20 so that the system is shut down, thereby disabling the restoration.

As an art dealing with this problem, the Japanese Patent Laid-Open No. 60-147866 discloses a multi-processor system in which data transfer is made between an MPU which has acquired a use of a bus as a bus master and an associated MPU as a bus slave. In this system, the bus master, without waiting for a ready signal from the bus slave, completes the bus access cycle in a certain period of time. If an XACK signal indicates that the data transfer is completed, the bus master completes the processor cycle. If the XACK signal indicates that the data transfer is incomplete, the bus master repeats the access to the bus slave through the bus in order to enable the data transfer.

Thus, even if the aforementioned hang-up state occurs, the system bus is once released, so that the system can continue the process without shutdown.

However, in this known example, if the XACK signal indicates that the data transfer is incomplete, the bus master repeatedly accesses the bus slave through the system bus until the data transfer is completed. This increases the time for which the system bus is being occupied, and worsens the efficiency of the bus utilization. Moreover, since the bus master accesses the system bus at the same timing as the cycle timing of the bus master, this example has not solved the decrease in the performance of the entire system due to the bottleneck caused by the system bus.

As an art dealing with this bottleneck, the Japanese Patent Laid-Open No. 5-265932 discloses a multi-processor system that controls a system bus with a common bus controller, in which an interface having a storage unit and a controller are connected between each MPU and the system bus. In this system, a memory with an access speed higher than each MPU is connected to the system bus. Data transfer between the MPU and the storage unit of the interface is done at an MPU access speed, so that a high-speed data transfer between the storage unit and the memory is achieved.

In this known example, the access time of the system bus depends on that of the memory. Therefore, it is always necessary to use a memory of a speed higher than the access time of the MPU, so that a cheap and high-capacity memory such as DRAM cannot be used.

SUMMARY OF THE INVENTION

It is accordingly an object of the present invention to provide a bus control device having a plurality of devices such as MPU's and DMAC's which can be a bus master are able to access a system bus wherein a system bus is efficiently used without the use of an expensive high-speed device or without being influenced by a low-speed device.

[1] For the achievement of the above-mentioned object, in a bus control device according to the present invention in which an MPU (processor) 10a which is a bus master and a memory 12 are commonly connected to a system bus, as schematically shown in FIG. 1, an MPU10 output buffer 30 is provided between the MPU 10a and the system bus 20. An MPU-system bus controller 15 controls the output buffer 30 with an output enable signal 40 (41), whereby an address signal 202, a control signal 24' and a data signal 208, which are output signals of the MPU 10a, access the system bus 20 within the accessible minimum time as an address signal 21 which also designates an address bus 21, a system control signal 24 and a data signal 22 which also designate a data bus 22, respectively.

As schematically shown in FIG. 2, a memory-latch circuit 33 is provided between the system bus 20 and the memory 12. A memory-system bus controller 16 controls the input timing of the latch circuit 33 with a latch enable signal 51, whereby the address signal 21, the data signal 22 and the system control signal 24, which are the output signals on the system bus 20, are stored and converted into an address signal 121, a data signal 122, a chip select signal 53 and a write signal 124, which are write signals for the memory 12, when the said output signals indicate the. memory write signals.

As a result, the time for the MPU 10a and the memory 12 accessing the system bus 20 can be minimized. Within this accessible minimum time, the MPU 10a will be able to write designated data in designated addresses on the memory 12.

It is to be noted that although an MPU-system bus synchronization controller 32 in FIG. 1 is included in the system bus controller 15, and a memory-control timing generator 34 in FIG. 2 is included in the system bus controller 16, they are shown outside of the system bus controllers 15, 16.

[2] Also, this invention, in addition to the above bus control device [1], comprises a memory output buffer 35 between the memory 12 and the system bus 20 (see FIG. 2) and an MPU latch circuit 31 between the system bus 20 and the MPU 10a (see FIG. 1). When the control signal 24 in FIG. 2, which forms the said output signals, indicates a memory read signal, the memory-system bus controller 16 converts it into a read signal in consideration of the access time of the memory 12, and when the output data signal 122 of the memory 12 becomes stable by controlling the memory output buffer 35, accesses the system bus 20 with the output data signal 22 within the accessible minimum time.

As illustrated in FIG. 1, the MPU-system bus controller 15 controls the input timing of the MPU latch circuit 31 with a system bus access/read signal 44 and a latch timing signal 46, thereby storing the data signal 22 to be read in the MPU 10a as the data signal 208.

As a result, the time for the MPU 10 and the memory 12 to access the system bus 20 can be minimized. Within this accessible minimum time, the MPU 10a will be able to read the data from the designated address on the memory 12.

[3] This invention will be described referring to FIG. 2 to 4.

The DMAC 11, which is a bus master (see FIG. 3), the memory 12 (see FIG. 2) and the processing circuit I/O 13a (see FIG. 4) are commonly connected to the system bus 20. A DMAC output buffer 36 (see FIG. 3) is provided between the DMAC 11 and the system bus 20.

As illustrated in FIG. 3, a DMAC-system bus controller 17 controls the output buffer 36 with an output enable signal 60, so that an address signal 202, the control signal 24' and a DMAC control signal 26, which are the output signals of the DMAC 11, may access the said system bus as the address signal 21, the system control signal 24 and the DMAC control signal 26, respectively within the accessible minimum time.

As illustrated in FIG. 2, similar to the above [1] and [2], the memory latch circuit 33 is provided between the system bus 20 and the memory 12. The memory-system bus controller 16 controls the memory latch circuit 33 with the latch enable signal 51, thereby latching the address signal 21, the data signal 22, the system control signal 24, and the bus control signal 25 which are the output signals on the system bus 20.

When the said output signal indicates a memory read signal, the memory-system bus controller 17 converts the said output signal into an address signal 121 which is a read signal in consideration of the access time of the memory 12 and the chip select signal 53. When the output data signal 122 of the memory 12 becomes stable, the controller 17 transmits the output data signal 122 through the output buffer 35 to the system bus 20 as the data signal 22 within the accessible minimum time.

As illustrated in FIG. 4, an I/O-system bus controller 18 which is the system bus controller for the processing circuit writes the data signal 22 in the processing circuit i.e. I/O 13a with signals 72 and 73 when the address signal 21, the data signal 22 and the system control signal 24, which are the output signals from the system bus 20, indicate data write signals.

As a result, the time for the DMAC 11, the memory 12 and the I/O 13a to access the system bus 20 can be minimized. Within this accessible minimum time, the DMAC 11 will be able to read the data from the designated address on the memory 12 and write the data in the designated I/O 13a.

It is to be noted that although a DMAC-system synchronization controller 37 in FIG. 3 is included in the system bus controller 17 and an I/O-control timing generator 38 in FIG. 4 is included in the system bus controller 18, they are shown outside of the system bus controllers 17, 18.

[4] This invention will be described referring to FIG. 2 to 4.

Similar to the above [3], the DMAC 11, the memory 12 and the I/O 13a are commonly connected to the system bus 20, and the DMAC output buffer 36 (see FIG. 3) is provided between the DMAC 11 and the system bus 20.

As illustrated in FIG. 3, the DMAC-system bus controller 17 controls the output buffer 36 with the output enable signal 60, and using the address signal 202, the control signal 24' (203~206) and the DMAC control signal 26, which are the output signals of the DMAC 11, access the system bus on the address signal 21, the system control signal 24 and the DMAC control signal 26 within the accessible minimum time.

As illustrated in FIG. 4, an I/O-output buffer 39 is provided between the I/O 13a and the system bus 20. When the control signal 24 which is the output signal indicates an I/O readout, by controlling the output buffer 39 with an output enable signal 71 the I/O-system bus controller 18 transmits the data signal 22 which is the output data of the I/O 13a to the system bus 20 within the accessible minimum time.

As illustrated in FIG. 2, similar to the above, the memory latch circuit 33 is provided between the system bus 20 and the memory 12. The memory-system bus controller 16 controls the memory latch circuit 33 with the latch enable signal 51, whereby the address signal 21, the data signal 22 and the system control signal 24, which are the output signals on the system bus 20, are stored and converted into the address signal 121, the system control signal 23', the data signal 122, the chip select signal 53 and the write signal 124, which are write signals in consideration of the access time of the memory 12.

As a result, the time for the DMAC 11, the memory 12 and the I/O 13a to access the system bus 20 can be minimized. Within this accessible minimum time, the DMAC 11 will be able to read the data from the designated I/O 13a and write the data in the designated memory 12.

[5] This invention will be described referring to FIGS. 1 and 4.

The MPU (processor) 10a (see FIG. 1) and the I/O 13a (see FIG. 4) are commonly connected to the system bus 20.

In FIG. 1, as above mentioned, the MPU-output buffer 30 is provided between the MPU 10a and the system bus 20. The MPU-system bus controller 15 controls the output buffer 30 with the output enable signal 40 (41), whereby the address signal 202, the control signal 24' and the data signal 208, which are output signals of the MPU 10a, access the system bus 20 as the address signal 21, the system control signal 24 and the data signal 22, respectively within the accessible minimum time.

In FIG. 4, when the address signal 21, the data signal 22 and the system control signal 24, which are the output signals on the system bus 20, indicate I/O write signals, the I/O-system bus controller 18 converts the said output signals into write signals to output the chip select signal 72 and the write signal 73 for writing the data.

As a result, the time for the MPU 10a and the I/O 13a to access the system bus 20 can be minimized. Within this accessible minimum time, the MPU 10a will be able to write the data in the designated I/O 13a.

[6] This invention will be described referring to FIGS. 1 and 4.

As above mentioned, the MPU (processor) 10a and the I/O 13a are commonly connected to the system bus 20.

In FIG. 4, the I/O-output buffer 39 is provided between the I/O 13a and the system bus 20, and by controlling the output buffer 39 with the output enable signal 71 the I/O-system bus controller 18 transmits the data signal 22 which is the output data of the I/O 13*a* to the system bus 20 within the accessible minimum time.

In FIG. 1, as above mentioned, the MPU latch circuit 31 is provided between the system bus 20 and the MPU 10*a*, and the MPU-system bus controller 15 controls the MPU latch circuit 31 with the system bus access/read signal 44 and a latch timing signal 46, thereby having the MPU 10*a* read in the output data 22 on the system bus 20 as the data signal 208.

As a result, the time for the MPU 10*a* and the I/O 13*a* to access the system bus 20 can be minimized. Within this accessible minimum time, the MPU 10*a* will be able to read the data from the designated address on the I/O 13*a*.

[7] Also, this invention, in addition to the above bus control device [3] or [5], as in the case with the memory latch circuit 33 shown in FIG. 2, an I/O latch circuit is provided. The I/O-system bus controller 18 controls the I/O latch circuit 33, whereby the address signal 21, the data signal 22 and the system control signal 23, which are the output signals on the system bus 20, are temporarily stored and converted into write signals in consideration of the access time of the I/O 13*a*.

As a result, the I/O 13*a* can definitely read in the data according to the access time.

[8] In addition, this invention, in any one of the above bus control devices [1] to [6], when a bus master of the system bus 20 has not completed the cycle and not accessed the system bus 20, another bus master may access the said system bus.

Namely, if a plurality of devices which can be a bus master are commonly connected to the system bus, when the device which is the bus master temporarily releases the system bus in a read/write cycle for instance, another device can use the system bus by performing a bus request.

As a result, since each bus master can use the system bus with a minimum occupation time, another bus master can use the released time of the system bus, thereby improving the utilization efficiency of the system bus.

[9] Also, in this invention, the processor, the memory, the DMAC and the I/O in the above bus control device [7] can be a bus master.

[10] Also, in this invention, the said memory latch circuit in any one of the above bus control devices [1], [3] and [4] may be a FIFO.

In FIG. 2, when the access time of the memory 12 is short, a FIFO is used for the latch circuit 33. As a result, the action for which each bus master access can be maintained.

BRIEF DESCRIPTION OF THE DRAWINGS

Throughout the figures, the same reference numerals indicate identical or corresponding portions.

DESCRIPTION OF THE EMBODIMENTS

Figure 1:
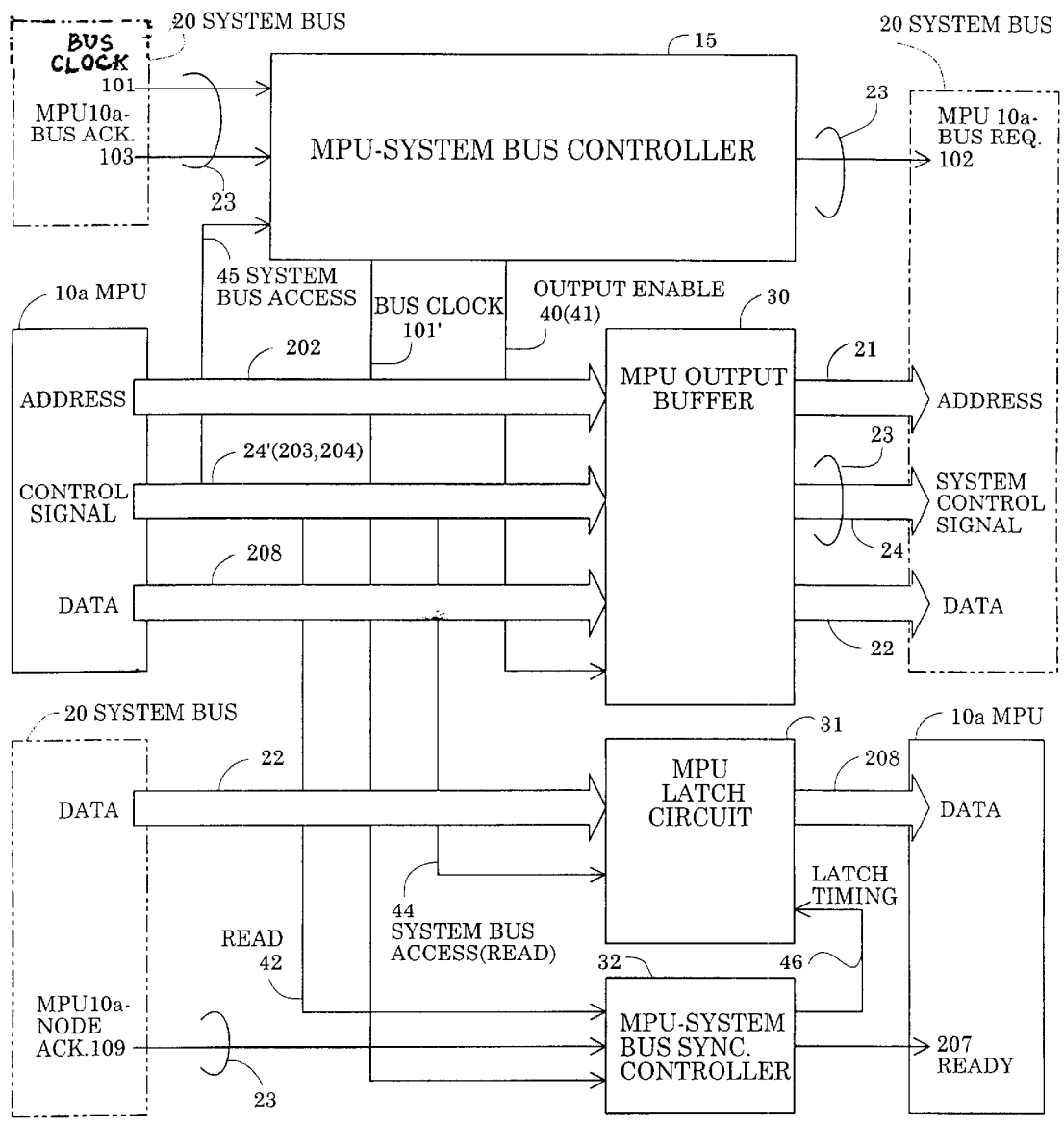
FIG. 1 is a block diagram illustrating a principle (1) of a bus control device according to the present invention.
Figure 5:
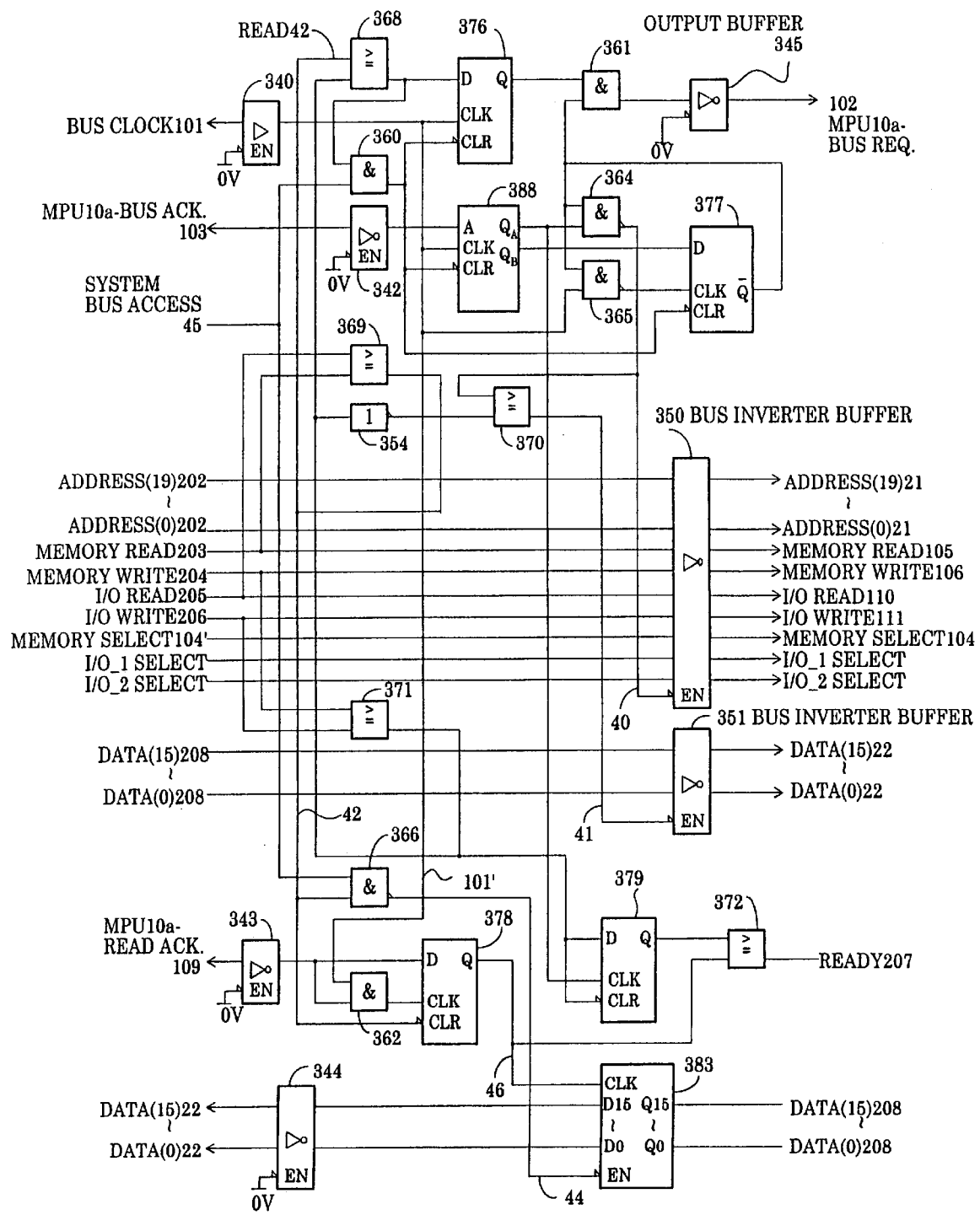
FIG. 5 is a logic circuit diagram showing an embodiment (1) of a bus control device according to the present invention.

FIG. 5 illustrates an embodiment (1) of a bus control device according to the present invention in the form of a logic circuit, which shows the details of the functional block shown in FIG. 1.

The MPU-output buffer 30 and the MPU latch circuit 31 in FIG. 1 correspond to buffers 350, 351 and a latch circuit 383 respectively. The synchronization controller 32 in FIG. 1 is formed of a buffer 343, an AND circuit 362 and D-FF circuits 378, 379 and an OR circuit 372. The bus controller 15 in FIG. 1 is formed of other logic elements in FIG. 5, the connections of which will be later described together with their operations. It is to be noted that the processor (MPU) 10*a* in FIG. 1 is omitted in FIG. 5.

Figure 2:
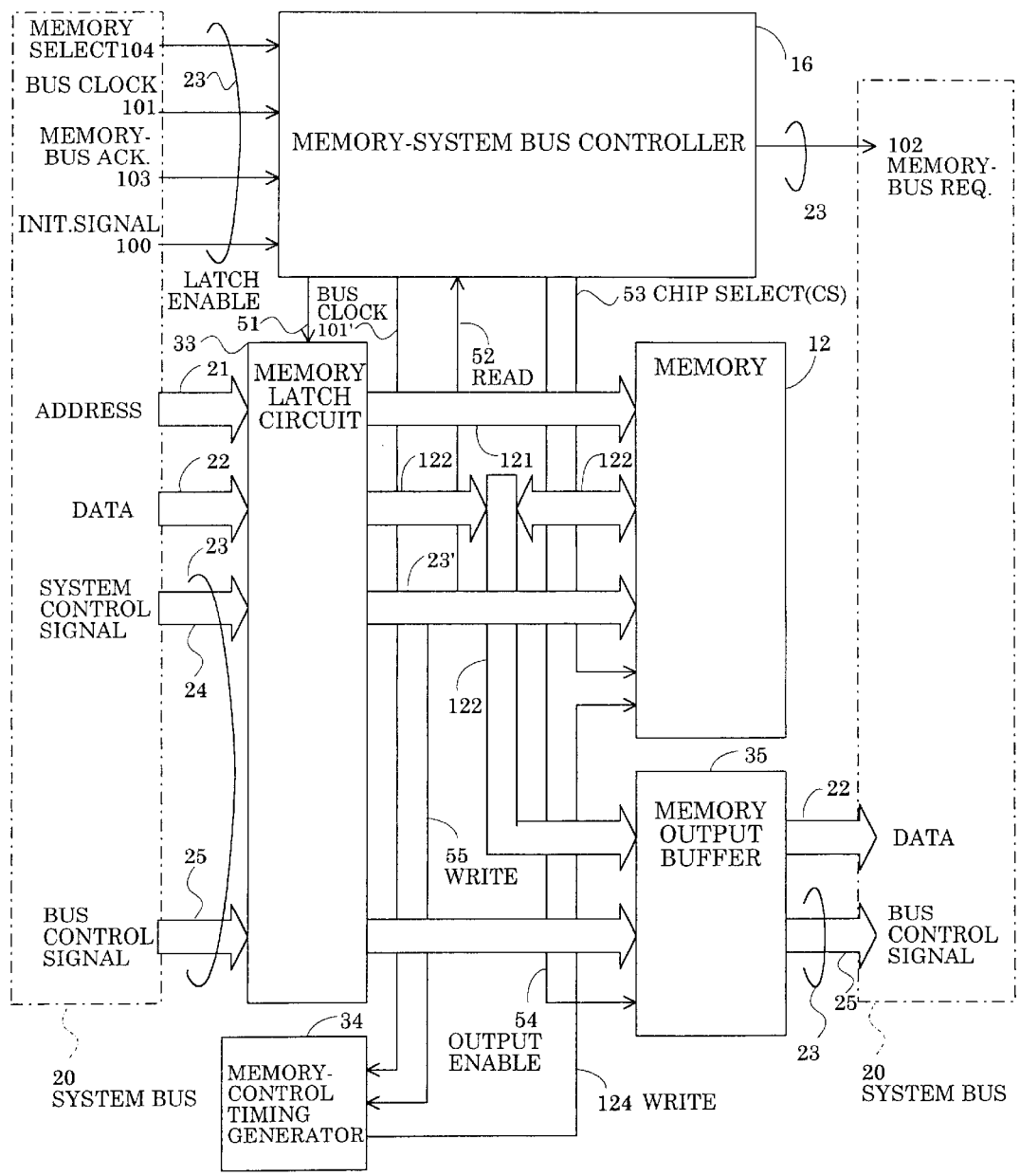
FIG. 2 is a block diagram illustrating a principle (2) of a bus control device according to the present invention.
Figure 6:
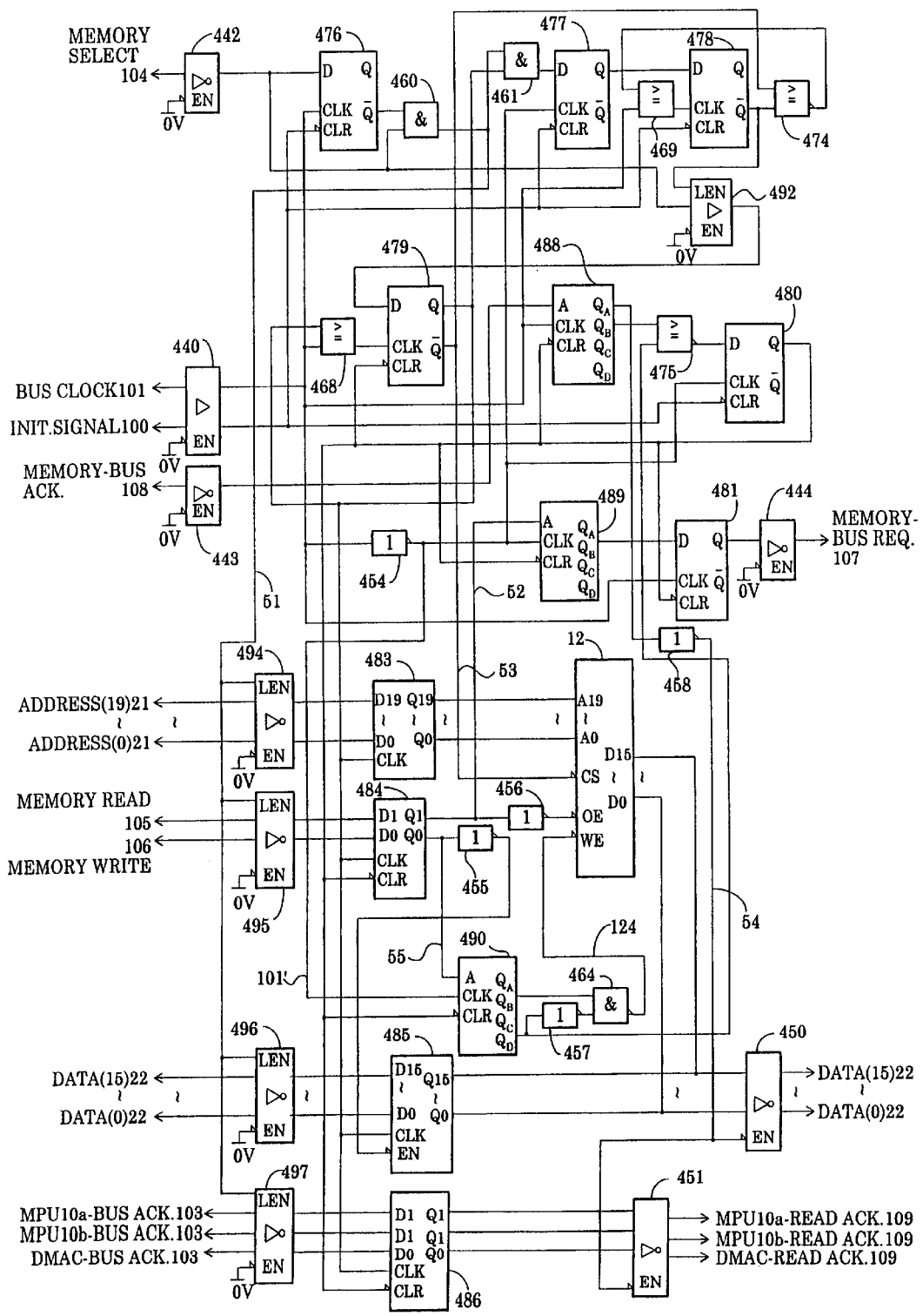
FIG. 6 is a logic circuit diagram showing an embodiment (2) of a bus control device according to the present invention.

FIG. 6 shows an embodiment (2) of the present invention in the form of a logic circuit, which shows the detail of the functional block shown in FIG. 2.

The memory 12 and the output buffer 35 in FIG. 2 correspond to the memory 12 and buffers 450, 451 respectively. The latch circuit 33 is formed of latch circuits 483–486 and 494–497, and the memory-control timing generator 34 is formed of a shift register 490, an inverter 457 and a NAND circuit 464. The system bus controller 17 in FIG. 2 is formed of remaining logic elements.

Figure 3:
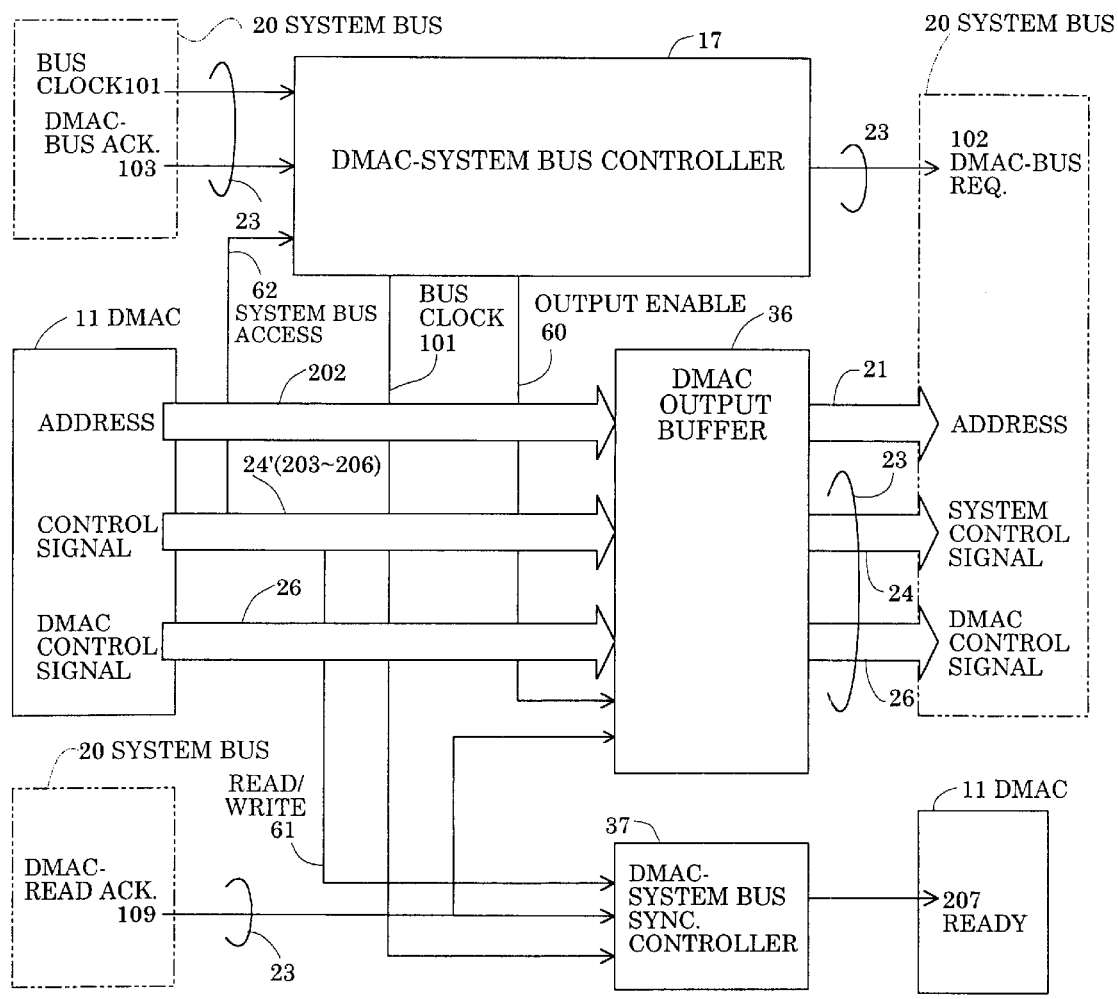
FIG. 3 is a block diagram illustrating a principle (3) of a bus control device according to the present invention.
Figure 7:
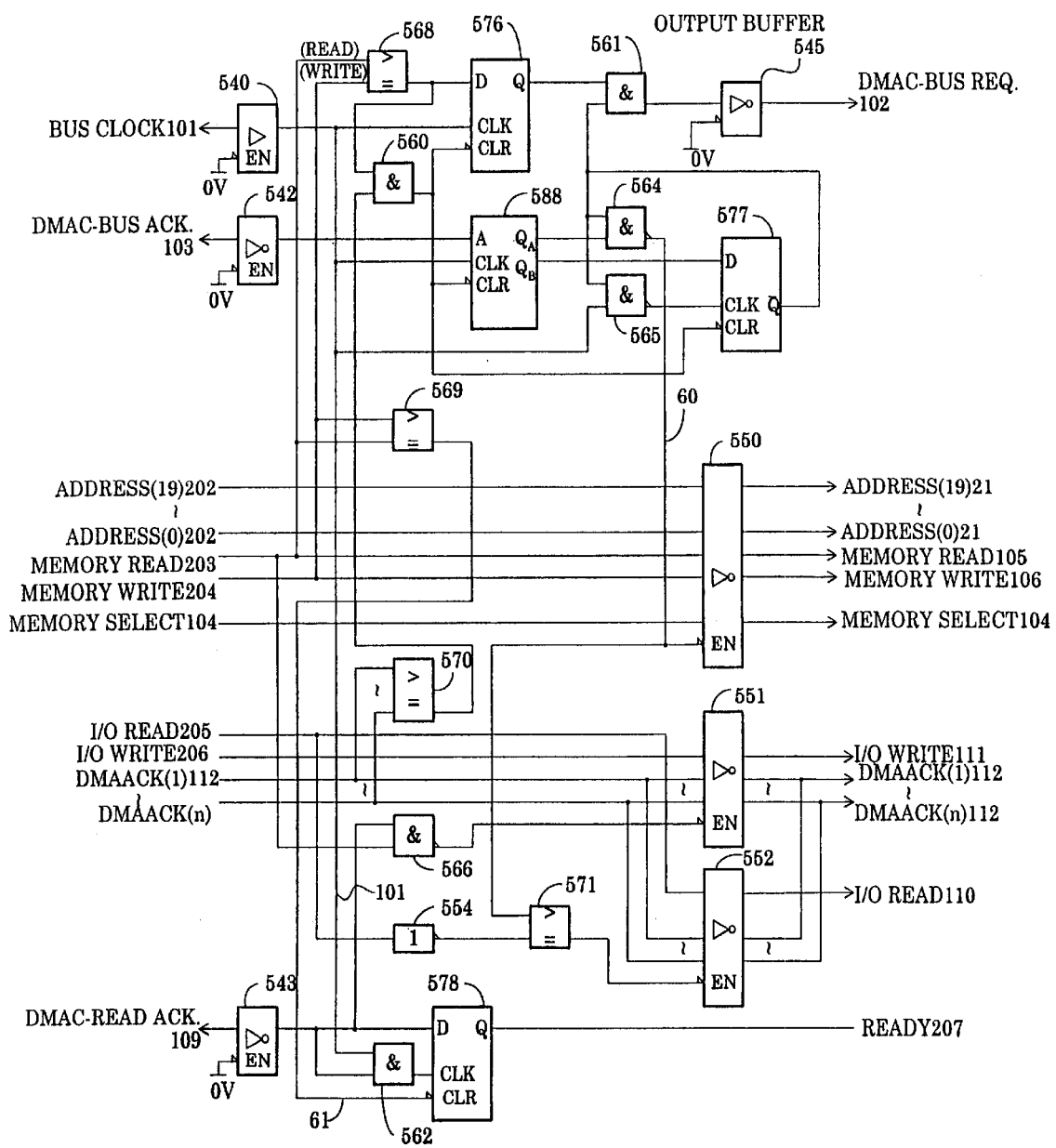
FIG. 7 is a logic circuit diagram showing an embodiment (3) of a bus control device according to the present invention.

FIG. 7 shows an embodiment (3) of the present invention in the form of a logic circuit, which shows the detail of the functional block shown in FIG. 3.

The output buffer 36 in FIG. 3 corresponds to buffers 550–552 in FIG. 7 and the system bus synchronous controller 37 corresponds to a buffer 543, an AND circuit 562, and a D-FF circuit 578.

The system bus controller 16 is formed of remaining logic elements, the connections of which will be later described together with their operations. It is to be noted that the DMAC 11 in FIG. 3 is omitted in FIG. 7.

Figure 4:
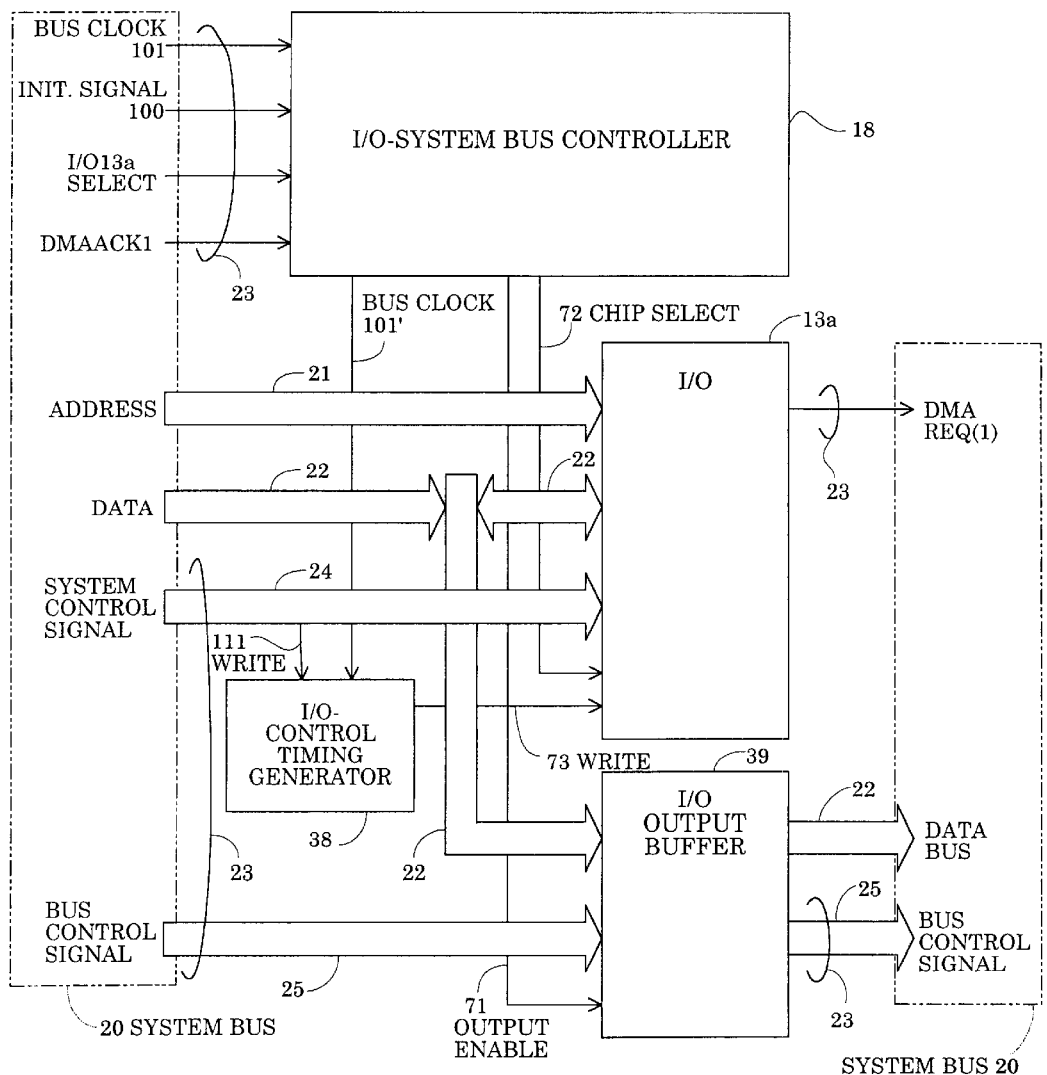
FIG. 4 is a block diagram illustrating a principle (4) of a bus control device according to the present invention.
Figure 8:
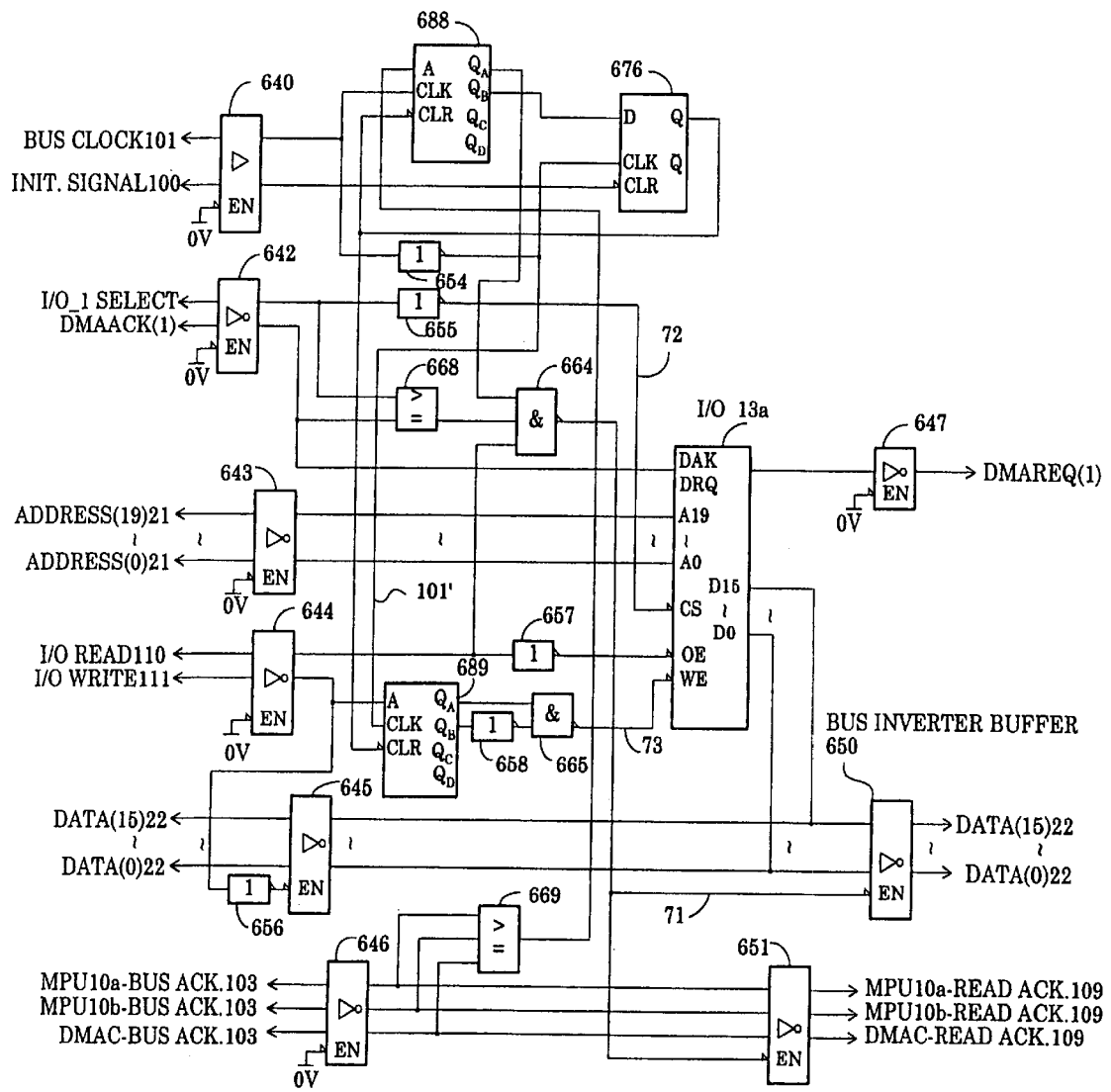
FIG. 8 is a logic circuit diagram showing an embodiment (4) of a bus control device according to the present invention.

FIG. 8 shows an embodiment (4) of the present invention in the form of a logic circuit, which shows the detail of the functional block shown in FIG. 4.

The I/O 13*a* and the output buffer 39 in FIG. 4 corresponds to the I/O 13*a*, the buffers 646, 650 and 651 respectively. The I/O-control timing generator 38 in FIG. 4 is formed of a buffer 644, a shift register 689, an inverter 658, and an AND circuit 665. The bus controller 18 is formed of remaining logic elements, the connections of which will be later described together with their operations.

Figure 9:
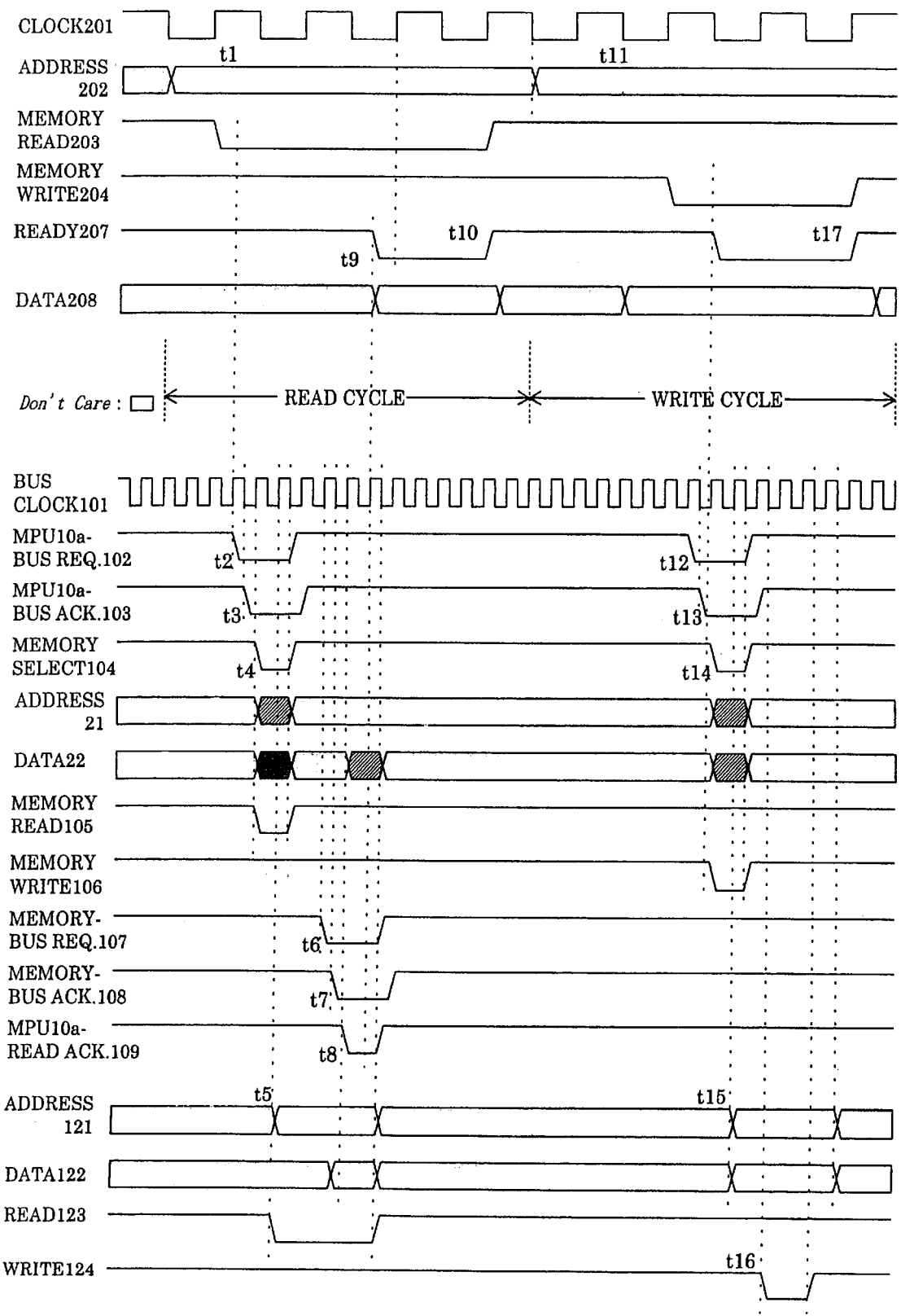
FIG. 9 is a timing chart showing a sequence of operations in embodiments (1) and (2) of the present invention.

FIG. 9 is a timing chart illustrating an operation example of the embodiments (1) and (2) of the present invention.

With reference to FIG. 9, the operation of the MPU 10a writing data by designated addresses in the memory 12 (see FIG. 6) will be hereinafter described referring to FIGS. 5 and 6.

In FIG. 5, when the MPU 10a based on a program accesses the system bus 20 to write data in the memory, the MPU 10a outputs a system bus access signal 45 (not shown in FIG. 9), a memory write signal 204, and a memory selection signal 104' (not shown in FIG. 9) as active signals. Moreover, the MPU 10a outputs an address signal 202 as well as a data (0)~(15) signal 208 at at timing t11 in FIG. 9.

The output signal of an AND circuit 360 which has inputted the system bus access signal 45 becomes active from inactive by a memory write signal 204 inputted through OR circuits 371 and 368. D-FF circuits 376, 377 and a shift register 388 having received this signal release the CLR (clear) state. The D-FF circuit 376 and the shift register 388 begin to operate in synchronization with the bus clock 101 inputted to a terminal CLK through a buffer 340. As a result, an output terminal Q of the D-FF circuit 376 with an input terminal D which is active, that is one of the input terminals of an AND circuit 361, becomes active.

Since the other input terminal of the AND circuit 361 inputs an active output signal /Q (/Q indicating reversed Q) of the D-FF circuit 377, the output of the AND circuit 361 becomes active and the bus request signal 102 which is the output of an output buffer 345 becomes active (at timing t12).

Receiving this bus request signal 102, the system bus returns the bus acknowledge signal 103 if not being used by other bus masters (at timing t13). Receiving this bus acknowledge signal 103 through a buffer 342 at an input terminal A, the shift register 388 activates output terminals $Q_A$ and $Q_B$ successively in synchronization with the bus clock 101.

The output terminal of a NAND circuit 364 which has an active input terminal connected to the terminal /Q of the D-FF circuit 377 becomes active when the output terminal $Q_A$ of the shift register 388 becomes active. When the output terminal $Q_B$ of the shift register 388 becomes active, the D-FF circuit 377 inputs the bus clock 101 at the terminal CLK through an AND circuit 365, and makes the output terminal /Q inactive. When this signal is inputted, the output terminals of the AND circuits 364 and 361 become inactive, so that the bus request signal 102 becomes inactive.

Only when the output signal 40 of the AND circuit 364 is active, the buffer 350 receives this signal 40 at an enable terminal EN, where the address (0)~(19) signal 202, a memory selection signal 104', the memory write signal 204 and the like can access the system bus 20 as an address (0)~(19) signal 21 (hatched portion in FIG. 9), a memory selection signal 104 and a memory write signal 106, respectively (at timing t14).

On the other hand, when the memory write signal 204 is active, one of the input terminals of an OR circuit 370 for the signal 204 through the OR circuit 371 and an inverter 354 becomes inactive. Therefore, the output signal of the AND circuit 364 activates the enable terminal EN of the buffer 351 through the OR circuit 370. Only when the output terminal of the AND circuit 364 is active, the buffer 351 lets the data (0)~(15) signal 208 access the data bus 22 as a data (0)~(15) signal 22 (hatched portion in FIG. 9) (at timing t14).

In FIG. 6, by receiving an initialization signal 100 through a buffer 440 at each terminal CLR, D-FF circuits 476~478 and 480 have each output terminal /Q active as an initial state. Receiving the memory selection signal 104 through a buffer 442, the D-FF circuit 476 changes the output terminal /Q from active to inactive in synchronization with the bus clock 101 inputted to the terminal CLK through the buffer 440.

Therefore, the output terminal of an AND circuit 460 is active from the time when the memory selection signal 104 becomes active until the rise of the bus clock 101. Receiving this active signal at the latch enable terminal EN, the latch circuits 494~497 latch the address (0)~(19) signal 21, a memory read signal 105, the data (0)~(15) signal 22 and the bus acknowledge signal 103, respectively.

The input terminal D of a D-FF circuit 479 has the memory selection signal 104 inputted through the buffer 442 and the latch circuit 492 which has an active terminal LEN. Only when the output terminal Q of the D-FF 479 is inactive, it becomes active when an OR circuit 468 gives the clock 101 to the terminal CLK (at timing t15). Having this signal inputted at the terminal CLK, the latch circuit 483~486 stores the output signals of the latch circuits 494~497 (at timing t15).

Moreover, a chip selection terminal CS of the memory 12 connected to the output terminal /Q of the D-FF circuit 476 which is active also becomes active.

The shift register 490, receives the memory write signal 106 at the input terminal A through the circuits 495, 484 and sequentially activates the output terminals $Q_A$~$Q_D$ in synchronization with the clock 101'. Using the signals $Q_B$ and $Q_D$, the inverter 457 and the NAND 464 produce a write signal 124 with the pulse signal between the rises of $Q_B$ and $Q_D$ and provide the write signal 124 to a write enable terminal WE of the memory 12 (at timing t16).

The memory 12 receives output data Q0~Q19 of the latch circuit 483 as the address signal 121, and stores output data Q0~Q15 of the latch circuit 485 as a data signal 122. When the output terminal $Q_D$ of the shift register 490 becomes active, the D-FF circuit 480 inputs this active signal at the input terminal D through the OR circuit 475, thereby making the output Q thereof inactive to clear the D-FF circuit 479 and the latch circuits 484 and 490.

On the other hand, in FIG. 5, the memory write signal 204 is inputted to the input terminal D and the terminal CLR of the D-FF circuit 379 through the OR circuit 371. The bus acknowledge signal 103 is provided for the terminal CLK of the D-FF circuit 379 through the buffer 342 and the shift register 388 in synchronization with the bus clock 101. As a result, the output signal Q of the D-FF circuit 379 is made inactive from the time when the memory write signal 204 and the bus acknowledge signal 103 becomes active to the time when the memory write signal 204 becomes inactive. When the signal Q is outputted through the buffer 372 as a ready signal 207, the ready signal 207 is made active from the rise of the terminal CLK until the memory write signal 204 becomes inactive (timings t14 and t17).

As a result, after outputting the address signal 21, the data signal 22 and the system control signal 24 to the system bus, the MPU10a receives the ready signal 207 and ends the operation.

It is to be noted that the timing for accessing the memory 12 can be set by changing the connection between the output terminal of the shift register 490 and the input terminals of the inverter 457 and the AND circuit 464.

The output terminal Q of the D-FF circuit 479 being active indicates that the memory write signal from the MPU10a is shifted from the latch circuits 494~496 to the latch circuits 483~485 and the memory 12 is being written.

In the following will be described the case where during the write operation an MPU 10b which is different from the MPU 10a accesses the memory 12 as the bus master to activate the memory selection signal 104.

The memory selection signal 104 makes the latch circuits 494–496 latche the memory write signal for the MPU 10b as a latch command through the buffer 442, the D-FF circuit 476 and the AND circuit 460. In addition, the memory selection signal 104 is subsequently shifted to the D-FF circuits 477 and 478 through the AND circuit 461 which has one input terminal connected to the output terminal Q of the D-FF circuit 479 which is active and activates the output terminal /Q of the D-FF circuit 478.

When the input terminal LEN connected to the output terminal /Q of the latch circuit 492 becomes inactive, the memory selection signal 104 through the buffer 442 is latched and outputted, and the input terminal D of D-FF circuit 479 is activated.

When the write signal of the MPU 10a completes the operation, the D-FF circuit 479 is cleared and the output terminal Q of MPU10a becomes inactive. Then the output terminal Q is activated again by the input terminal D which is active. As a result, the MPU 10b performs the write operation in the memory.

With reference to FIG. 9, the operations in FIG. 5 and 6 will be described in the case that the MPU 10a reads data by designating the address of the memory 12 as follows.

In this case, since the system bus is accessed for the memory read operation, the system bus access signal 45 and a memory read signal 203 become active (at timing t1 in FIG. 9). In addition, the MPU10a outputs the address signal 202.

As a result, similar to timings t12~t14 indicating the memory write operation in FIG. 9, the address (0)~(19) signal 202 in FIG. 5 outputted from the MPU10a becomes accessible to the address bus 21 only for the minimum time (hatched portion in FIG. 9) (at timing t2~t4).

Therefore, the memory read signal 105 converted from the memory read signal 203 through the buffer 350 is active on the bus only for the hatched portion in FIG. 9.

In FIG. 6, the address signal 21 and the memory read signal 105 are temporarily stored in the latch circuits 483 and 484 respectively (at timing t5), and given to the memory 12.

Namely, the memory read signal 105 is given to an output enable terminal OE of the memory 12 through the latch circuits 495, 484 and the inverter 456. The memory 12 outputs the data signal 208 on an address signal 202 (address (0)~(15) signal 21) designated from the output terminals D0~D15.

On the other hand, the memory read signal 105 is outputted to the system bus as a memory-bus request signal 107 through the latch circuits 495, 484, the shift register 489, the D-FF circuit 481, and the buffer 44 (at timing t6). If the system bus 20 is not accessed, the system bus returns a memory-bus acknowledge signal 108 (at timing t7).

Receiving the bus acknowledge signal 108 through a buffer 443 at the input terminal A, a shift register 488 subsequently activates the outputs $Q_A$ and $Q_B$ in synchronization with the clock 101. When the output $Q_A$ becomes active, each terminal EN of the buffers 450 and 451 connected through the inverter 458 becomes active.

As a result, the buffer 450 outputs the data signal 122 (the output signals D0~D15 of the memory 12) to the data bus 22 as the data (0)~(15) signal 22 (hatched portion in FIG. 9). The buffer 451 outputs the bus acknowledge signal 103 which has been latched by the latch circuit 486 as an MPU 10a-read acknowledge signal 109 (at timing t7).

When the output terminal $Q_B$ of the shift register 488 becomes active, the output terminal Q of the D-FF circuit 480 with the input terminal D connected to the output terminal $Q_B$ through the NOR circuit 475 becomes inactive. Therefore, the shift registers 488, 489, the D-FF circuits 479, 481 and the latch circuits 484 are cleared.

In FIG. 5, the AND circuit 362 which has received the read acknowledge signal 109 through the buffer 343 outputs the bus clock 101 inputted at the other terminal and gives to the terminal CLK of the D-FF circuit 378. Since the activate memory read signal 203 is received at the terminal CLR through an OR circuit 369, the D-FF circuit 378 is in its operating state and outputs the acknowledge signal 109 inputted at the terminal D from the output terminal Q in response to the bus clock 101 at the terminal CLK (at timing t8).

The latch circuit 383 with the terminal CLK provided with the signal from the output terminal Q of the D-FF circuit 378 latches the data (0)~(15) signal 22 on the data bus 22 inputted through the buffer 344, and outputs the same to the input/output terminals of the MPU 10a as the data (0)~(15) signal 208 only when the system bus access signal 45 inputted at the output enable terminal EN through the NAND circuit 366 is active.

On the other hand, the signal from the output terminal Q of D-FF circuit 378 is given to the MPU 10a as the ready signal 207 through the OR circuit 372 (at timing t9). The MPU10a reads in the data (0)~(15) signal 208 and completes the operation.

In addition, the MPU 10a completes the read cycle by the ready signal 207, makes each signal such as the address signal 202, the data signal 208 and the memory read signal 203 included in the control signal inactive, and ends the operation of the processor (at timing t10).

As a result, the MPU 10a is able to read the data on the designated address of the memory 12 for the minimum time for which the MPU 10a and the memory 12 can access the system bus 20 (hatched portion of data signal 22).

Figure 10:
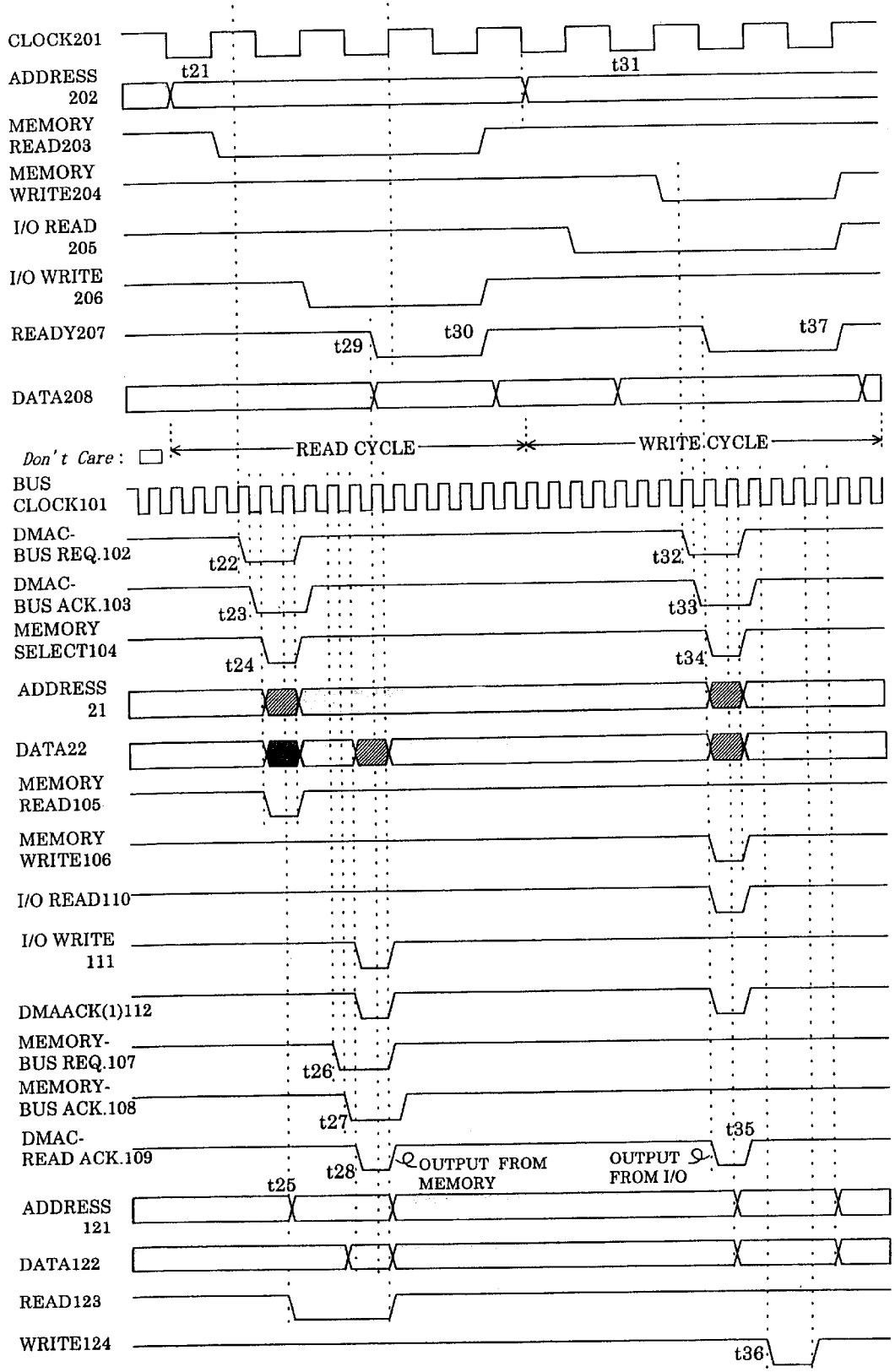
FIG. 10 is a timing chart showing a sequence of operations in embodiments (3), (4) and (5) of the present invention.
Figure 11:
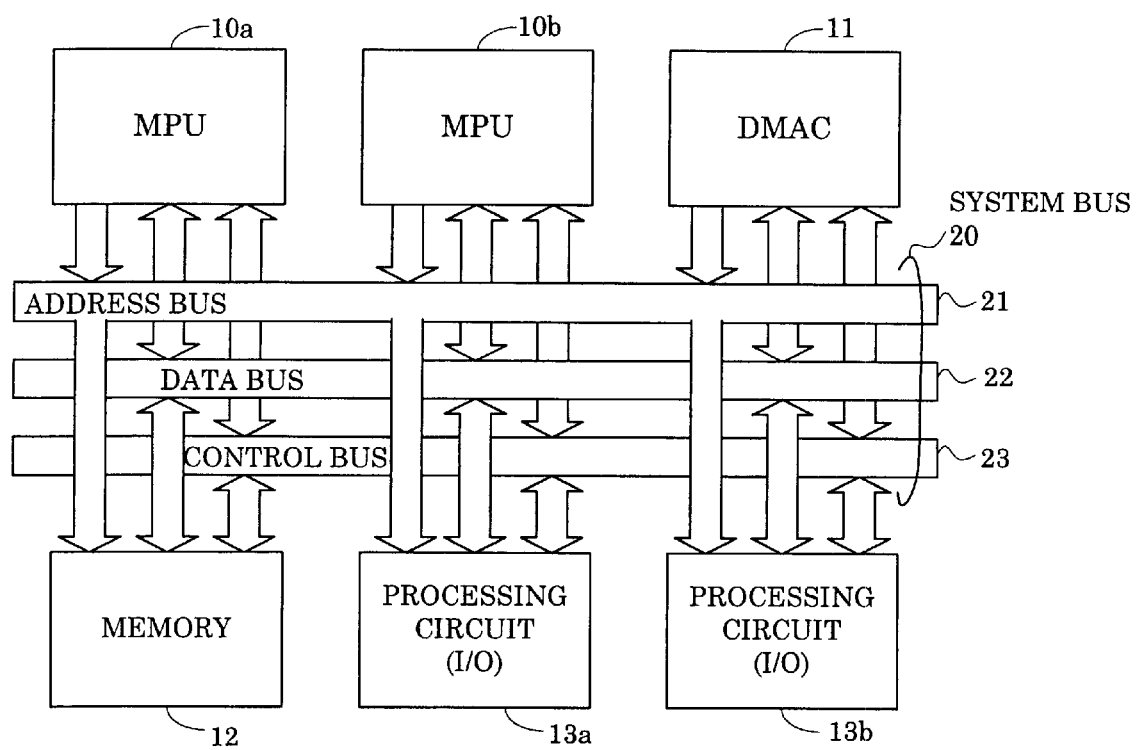
FIG. 11 is a block diagram illustrating an arrangement of a general bus control device.
Figure 12:
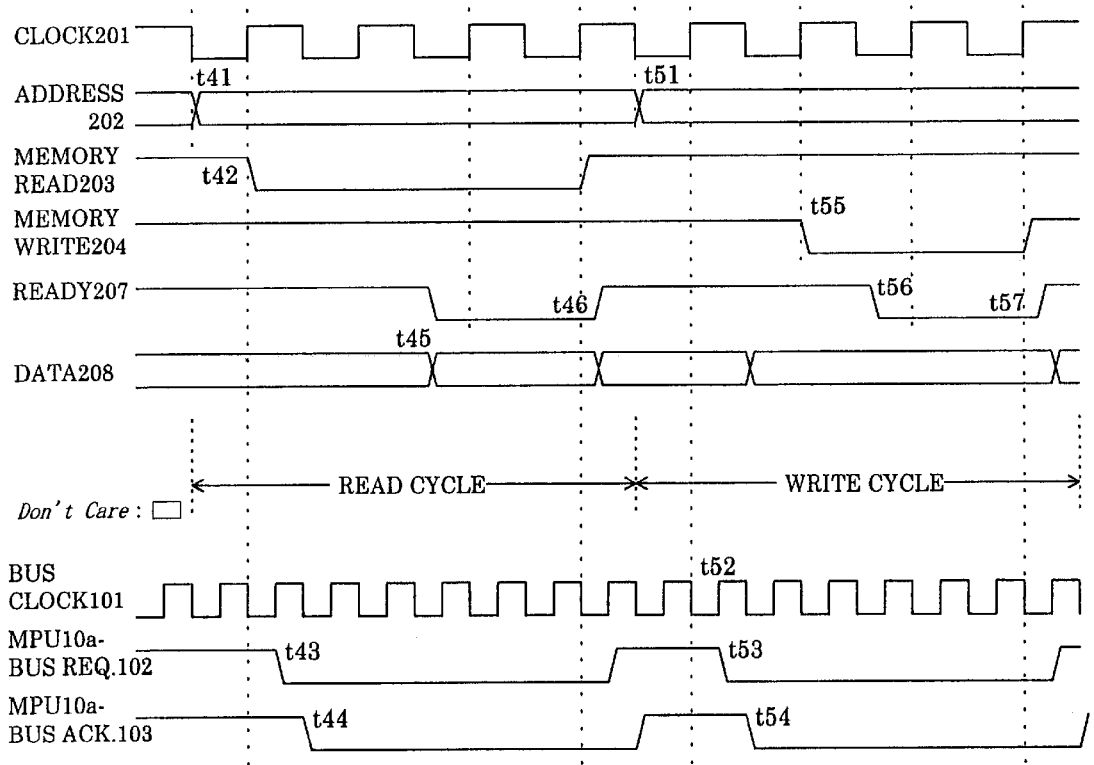
FIG. 12 is a timing chart showing a sequence of accesses by a processor in a prior art bus control device.
Figure 13:
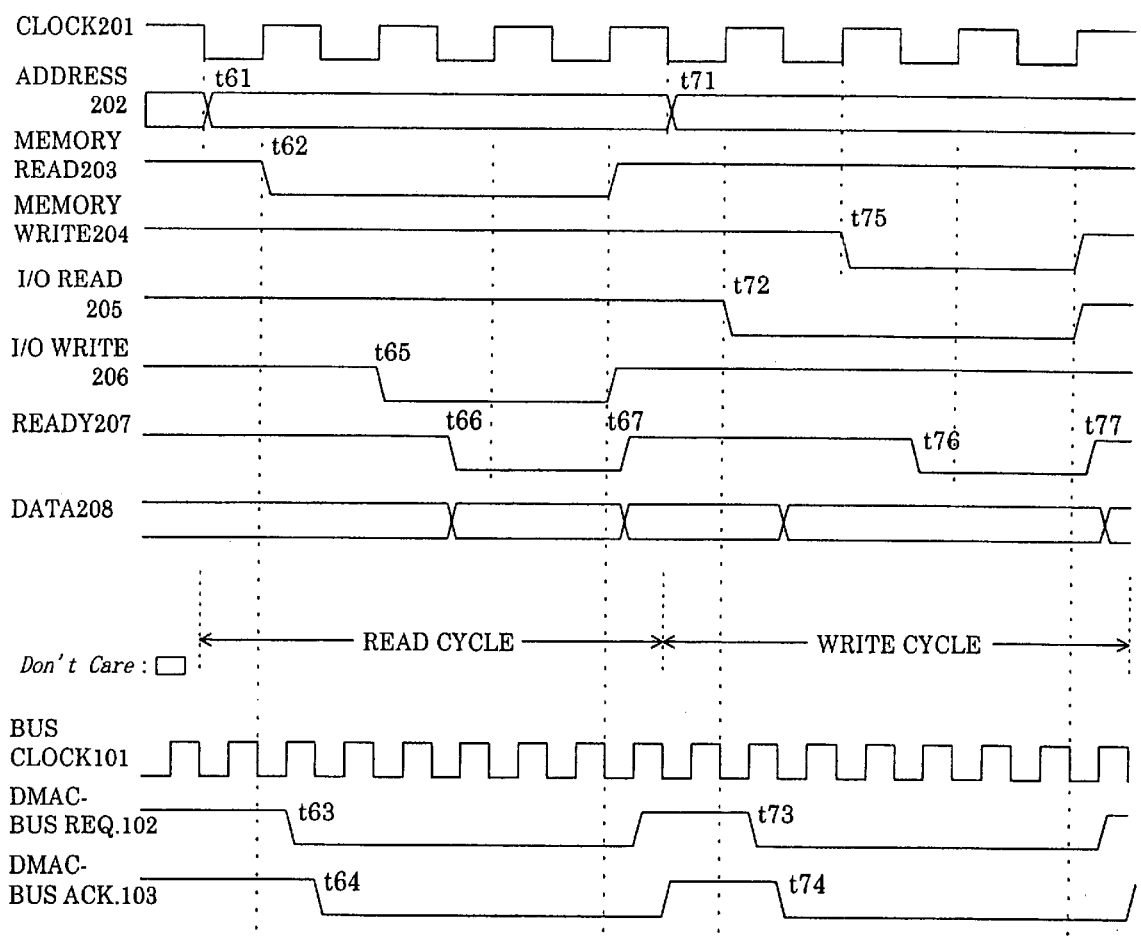
FIG. 13 is a timing chart showing a sequence of accesses by a DMAC in a prior art bus control device.

FIG. 10 is a timing chart illustrating operation examples of embodiments (2) to (4) of the present invention. The operation of the DMCA 11 when reading the data from the memory 12 and writing them in the I/O 13a will be hereinafter described referring to FIGS. 6–8, 10.

First of all, different from the memory read operation by the MPU 10a in FIG. 9, the memory read signal 203 is provided by the DMAC 11.

Therefore, by way of an OR circuit 568, an AND circuit 560, a D-FF circuit 576, a shift register 588, an AND circuit 561, NAND circuits 564, 565, a D-FF circuit 577 and an output buffer 544 in FIG. 7, the DMAC-bus request signal 102 becomes active (at timing t22 in FIG. 10).

Similar to FIG. 9, by obtaining the DMAC-bus acknowledge signal 103 (at timing t23), the DMAC 11 acquires a use of the system bus. Then, the address signal 21 (at timing t24), the memory selection signal 104 (at timing t24) and memory read signal 105(at timing t24) are outputted to the system bus.

In addition, in FIG. 6, by latching the address signal 21 and the memory read signal 105 in the latch circuit 483 and 484, the address signal 121 and the read signal 123 are given to the memory 12 (at timing t25). When time elapses from timing t25 to the time when the output data of the memory 12 is made stable, the memory-bus request signal 107 becomes active.

If the system bus 20 is not occupied at this time, it returns the memory-bus acknowledge signal 108 (at timing t27).

Receiving this memory-bus acknowledge signal 108, the output data D0~D15 of the memory 12 from the buffer 450 is outputted to the data bus 22 as the data (0)~(15) signal 22 by the enable signal through the shift register 488 and inverter 458 (the hatched portion).

In FIG. 6, the DMAC-bus acknowledge signal 103 is outputted through the buffer 497, the latch circuit 486 and the buffer 451 as the DMAC-read acknowledge signal 109 (at timing t28).

This has the data signal 22 access to the system bus 20, so that the next operation is performed by the DMAC to write them in the I/O 13a.

In FIG. 7, first of all, the DMAC-system bus controller 17 which has received the above-mentioned DMAC-read acknowledge signal 109 outputs this signal through the buffer 543, a NAND circuit 566 with one of the inputs being the active memory read signal 203 and a buffer 551 as a DMAACK (1) 112.

In FIG. 8, the I/O-system bus controller 18 which has received the DMAACK (1) 112 gives this signal to the terminal CS of the I/O 13a through the buffer 642 and the inverter 655.

In addition, an I/O write signal 206 outputted from the DMAC-system bus controller 17 is outputted by the buffer 551 (see FIG. 7) as an I/O write signal 111 (at timing t28). In FIG. 8, this I/O write signal 111, by way of the buffer 44, the shift register 689, the inverter 658 and the NAND circuit 665, is given to the write enable terminal WE of I/O 13a.

At this time, the I/O write signal 111 is given to the enable terminal EN of the buffer 645 through the buffer 644 and an inverter 656. Therefore, the data (0)~(15) signal 22 are given as the data D0~D15 for the I/O 13a through the buffer 645.

On the other hand, the DMAC-system bus controller 17 which has received the DMAC-read acknowledge signal 109 (see FIG. 7) returns the ready signal 207 to the DMAC 11 through the buffer 543, the AND circuit 562 and the D-FF circuit 578 (at timing t29). The DMAC 11 which has received the ready signal 207 ends the operation (at timing t30).

Next, with reference to FIG. 10, the operations of the DMAC 11 when reading out the data of the I/O 13a to the system bus 20 and writing the data in the memory 12 will be described as follows.

First of all, the DMAC 11 outputs the address signal 202, and activates the I/O read signal 205 and the memory write signal 204 (at timing t31 in FIG. 10). Then, as in the I/O write operation, the DMAC-bus request signal 102 and the DMAC-bus acknowledge signal 103 are transferred so that the DMAC 11 acquires a use of the bus (timings t32 and t33).

As a result, in the same manner as the MPU-system bus controller 15, the I/O read signal 205, the address (0)~(19) signal 202 and the memory write signal 204 are outputted as the I/O read signal 110, the address (0)~(19) signal 21 and the memory write signal 106 respectively through the buffers 552 and 550, as shown in FIG. 7.

In FIG. 8, the DMAC-bus acknowledge signal 103 is further outputted as the DMAC-read acknowledge signal 109 through the buffer 646 and the buffer 651 (timings t34 and t35). The I/O read signal 110 is given to the output enable terminal OE of the I/O 13 through the buffer 644 and, from the data terminals D0~D15 of the I/O 13a, outputted to the system bus 20 as the data (0)~(15) through the buffer 650. Address (0)~(19) signal 21 are given to the address terminals A0~A19 of the memory 12 through latch circuits 494 and 483.

In FIG. 6, the memory write signal 106 is given to the enable terminal WE of the memory 12 through the buffer 495, the latch circuit 484, the shift register 490, the inverter 457, and the NAND circuit 464. On the other hand, the data (0)~(15) signal 22 on the system bus 20 are given to the data terminals D0~D15 of the memory 12 through the buffer 496 and the latch circuit 485. Therefore, the data signal 22 is to be written in the memory 12 with the memory write signal 106 (at timing t36).

On the other hand, the DMAC-system bus controller 17 which has received the DMAC-read acknowledge signal 109 from the system bus controller 18 for the I/O, as above mentioned, returns the ready signal 207 to the DMAC 11 through the buffer 43 and D-FF circuit 75 (at timing t29). The DMAC 11 ends the operation (at timing t30).

As described above, the bus control device according to the present invention is composed of a plurality of bus masters such as an MPU and a DMAC. When the MPU transfers data with a memory or an I/O, an MPU-system bus controller and a memory-system bus controller or an I/O-system bus controller are arranged so that a system bus may be accessed for an accessible minimum time with each of input/output signals. When the DMAC transfers data with the memory or the I/O, a DMAC-system bus controller and the memory-system bus controller or the I/O-system bus controller are arranged so that the system bus may be accessed for the accessible minimum time with each of the input/output signals. Therefore, the system bus can be efficiently utilized without using expensive high-speed access devices and without influences by low-speed access devices.

As a result, a waiting state of the MPU during the system bus occupied by other MPU's or a non-accessible state of the system bus from the MPU during the DMA transfer can be avoided, thereby improving the system efficiency.

Also, the decline of the system performance caused by the memories or the I/O's low in access time can be prevented.

Moreover, since no hang-up state occurs with the system bus occupied, a more reliable system may be established by providing relief measures for the hang-up among the bus masters (such as MPU's).

What we claim is:

1. A bus control device, which has a processor and a memory commonly connected to a system bus, comprising:

an output buffer for the processor provided between the processor and the system bus;

the processor outputting output signals to the system bus, the output signals being associated with a memory read request;

a system bus controller for the processor, said system bus controller for the processor controlling the output buffer for the processor and releasing the system bus after the output signals have been accessed by the system bus to have the output signals of the processor access the system bus within an accessible minimum time;

a memory latch circuit provided between the system bus and the memory; and a system bus controller for the memory which controls an input timing of the memory latch circuit to store the output signals provided on the system bus and provide the output signals to the memory;

wherein the system bus is released during a substantial portion of a period of time required for the memory to reply to said read request, and the accessible mimimum time is a minimum time needed for the system bus to access the output signals in order for the memory latch circuit to store the output signals.

2. A bus control device as claimed in claim 1, further comprising:
  a memory output buffer provided between the memory and the system bus, and a processor latch circuit provided between the system bus and the processor;
  when the output signals indicate a memory read, the system bus controller for the memory converting the output signals into read signals in consideration of an access time of the memory;
  when output data of the memory become stable by controlling the memory output buffer, the system bus controller for the memory accessing the system bus with the output data within the accessible minimum time; and
  the system bus controller for the processor controlling an input timing of the processor latch circuit, thereby storing the output data to be read in the processor.

3. A bus control device which has a DMAC, a memory and a processing circuit commonly connected to a system bus, comprising:
  a DMAC output buffer provided between the DMAC and the system bus;
  the DMAC outputting output signals to the system bus, the output signals being associated with a memory read request;
  a system bus controller for the DMAC controlling the DMAC output buffer and releasing the system bus after the DMAC has outputted the output signals so as to have the output signals of the DMAC access the system bus within an accessible minimum time;
  a memory latch circuit provided between the system bus and the memory;
  a system bus controller for the memory which controls the memory latch circuit to store the output signals provided on the system bus, provides the output signals to the memory, and makes output data of the memory access the system bus within the accessible minimum time when the output data become stable; and
  a system bus controller for the processing circuit which accesses the system bus to write the output signals in the processing circuit when the output signals indicate data write signals;
  wherein the system bus is released during a substantial portion of a period of time required for the memory to reply to said read request, and the accessible minimum time is a minimum time needed for the system bus to access the DMAC output signals in order for the memory latch circuit to store the DMAC output signals.

4. A bus control device, which has a DMAC, a memory and a processing circuit commonly connected to a system bus, comprising:
  a DMAC output buffer provided between the DMAC and the system bus;
  the DMAC outputting output signals to the bus;
  a system bus controller for the DMAC controlling the DMAC output buffer and releasing the system bus after the DMAC has outputted the output signals so as to have the output signals of the DMAC access the system bus within an accessible minimum time;
  an output buffer for the processing circuit provided between the processing circuit and the system bus;
  a system bus controller for the processing circuit which controls the output buffer for the processing circuit to have output data of the processing circuit access the system bus within the accessible minimum time;
  a memory latch circuit provided between the system bus and the memory; and
  a system bus controller for the memory which controls the memory latch circuit to store the output data on the system bus and to provide the output data to the memory;
  wherein the accessible minimum time is a minimum time needed for the system bus to access the output data in order for the memory latch circuit to store the output data.

5. A bus control device, which has a processor, a memory and a processing circuit commonly connected to a system bus, comprising:
  a processor output buffer provided between the processor and the system bus and the memory;
  the processor outputting output signals to the system bus;
  a system bus controller for the processor, the system bus controller for the processor controlling the processor output buffer and releasing the system bus after the processor has outputted the output signals so as to have the output signals of the processor access the system bus within an accessible minimum time; and
  a system bus controller for the processing circuit which converts the output signals into write signals when the output signals on the system bus indicate write signals for the processing circuit;
  wherein the accessible minimum time is a minimum time needed for the system bus to access the output signals in order for the memory latch circuit to store the output signals.

6. A bus control device, which has a processor and a processing circuit commonly connected to a system bus, comprising:
  an output buffer for the processing circuit provided between the processing circuit and the system bus;
  the processing circuit outputting output data to the system bus;
  a system bus controller for the processing circuit controlling the output buffer for the processing circuit and releasing the system bus after the processing circuit has outputted the output data so as to make the output data of the processing circuit access the system bus within an accessible minimum time,
  a processor latch circuit provided between the system bus and the processor; and
  a system bus controller for the processor which controls the processor latch circuit to generate a readin signal for the processor to read in the output data on the system bus;
  wherein the accessible minimum time is a minimum time needed for the system bus to access the output data in order for the processor latch circuit to store the output data.

7. A bus control device as claimed in claim 3, further comprising:
  an additional latch circuit for e processing circuit provided between the system bus and the processing circuit,
  a system bus controller for the processing circuit which controls the latch circuit to temporarily store and convert the output signals on the system bus into write signals in consideration of an access time of the processing circuit.

8. A bus control device as claimed in claim 5, further comprising:
- an additional latch circuit for the processing circuit provided between the system bus and the processing circuit,
- a system bus controller for the processing circuit which controls the latch circuit to temporarily store and convert the output signals on the system bus into write signals in consideration of an access time of the processing circuit.

9. A bus control device as claimed in claim 1, wherein when a bus master of the system bus has not completed the cycle and is not accessing the system bus, another bus master can access the system bus.

10. A bus control device as claimed in claim 2, wherein when a bus master of the system bus has not completed the cycle and is not accessing the system bus, another bus master can access the system bus.

11. A bus control device as claimed in claim 3, wherein when a bus master of the system bus has not completed the cycle and is not accessing the system bus, another bus master can access the system bus.

12. A bus control device as claimed in claim 4, wherein when a bus master of the system bus has not completed the cycle and is not accessing the system bus, another bus master can access the system bus.

13. A bus control device as claimed in claim 5, wherein when a bus master of the system bus has not completed the cycle and is not accessing the system bus, another bus master can access the system bus.

14. A bus control device as claimed in claim 6, wherein when a bus master of the system bus has not completed the cycle and is not accessing the system bus, another bus master can access the system bus.

15. A bus control device as claimed in claim 7, wherein a bus master is any one of the processor, the memory, the DMAC and the processing circuit.

16. A bus control device as claimed in claim 8, wherein a bus master comprises any one of the processor, the memory, the DMAC and the processing circuit.

17. A bus control device as claimed in claim 1, wherein the memory latch circuit comprises a FIFO.

18. A bus control device as claimed in claim 3, wherein the memory latch circuit comprises a FIFO.

19. A bus control device as claimed in claim 4, wherein the memory latch circuit comprises a FIFO.

* * * * *